(12) United States Patent
Oh et al.

(10) Patent No.: US 8,191,129 B2
(45) Date of Patent: May 29, 2012

(54) APPARATUS AND METHOD FOR PROCESSING DIGITAL RIGHTS OBJECT

(75) Inventors: Yun-sang Oh, Seoul (KR); Tae-sung Kim, Seoul (KR); Kyung-im Jung, Seongnam-si (KR); Shin-han Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 11/178,340

(22) Filed: Jul. 12, 2005

(65) Prior Publication Data

US 2006/0010498 A1 Jan. 12, 2006

Related U.S. Application Data

(60) Provisional application No. 60/586,724, filed on Jul. 12, 2004.

(30) Foreign Application Priority Data

Sep. 15, 2004 (KR) .................. 10-2004-0073819

(51) Int. Cl.
*G06F 21/00* (2006.01)
(52) U.S. Cl. ..................... 726/9; 705/902; 715/239
(58) Field of Classification Search .............. 726/9, 20, 726/26; 713/187; 705/901–903; 455/72; 707/693; 715/239
See application file for complete search history.

(56) References Cited

U.S. PATENT DOCUMENTS

| | | | |
|---|---|---|---|
| 6,606,707 B1 * | 8/2003 | Hirota et al. .................. | 713/172 |
| 7,315,829 B1 * | 1/2008 | Tagawa et al. ................ | 705/26 |
| 2003/0126086 A1 | 7/2003 | Safadi | |
| 2003/0140009 A1 * | 7/2003 | Namba et al. .................. | 705/59 |
| 2003/0233330 A1 * | 12/2003 | Raley et al. .................... | 705/55 |
| 2004/0001594 A1 | 1/2004 | Krishnaswamy et al. | |
| 2004/0015408 A1 * | 1/2004 | Rauen et al. .................... | 705/26 |
| 2004/0236717 A1 * | 11/2004 | Demartini et al. .............. | 707/1 |
| 2005/0132264 A1 * | 6/2005 | Joshi et al. .................. | 715/500.1 |
| 2005/0210249 A1 * | 9/2005 | Lee et al. ...................... | 713/168 |
| 2005/0216419 A1 * | 9/2005 | Lee et al. ...................... | 705/59 |
| 2005/0267845 A1 * | 12/2005 | Oh et al. ........................ | 705/51 |
| 2005/0268097 A1 * | 12/2005 | Oh et al. ........................ | 713/168 |
| 2006/0101010 A1 * | 5/2006 | Benjelloun Touimi et al. | 707/4 |
| 2006/0150180 A1 * | 7/2006 | Schmidt et al. ............... | 717/173 |
| 2006/0265441 A1 * | 11/2006 | Andersson et al. ........... | 708/200 |
| 2008/0046373 A1 * | 2/2008 | Kim ............................... | 705/51 |

FOREIGN PATENT DOCUMENTS

| | | |
|---|---|---|
| CN | 1287665 A | 3/2001 |
| CN | 1316087 A | 10/2001 |
| EP | 1309926 A1 | 5/2003 |
| KR | 2003-0071395 A | 9/2003 |
| KR | 10-2004-0001364 A | 1/2004 |
| WO | 03079270 A1 | 9/2003 |

* cited by examiner

*Primary Examiner* — Hadi Armouche
(74) *Attorney, Agent, or Firm* — Sughrue Mion, PLLC (57) ABSTRACT

An apparatus and a method that transmit and receive a converted format of a digital rights object between a device and a portable storage device. The apparatus for processing a digital rights object includes a transmitting/receiving module for receiving the rights object expressed in a Markup language from a rights issuer, a rights object converting module for converting the rights object into a frame having a format for communicating with a portable storage device, an interface for connecting with the portable storage device, and a control module for providing the frame to the portable storage device through the interface and receiving the converted format of the rights object from the portable storage device through the interface.

29 Claims, 7 Drawing Sheets

APPARATUS AND METHOD FOR PROCESSING DIGITAL RIGHTS OBJECT

This application claims priorities from Korean Patent Application No. 10-2004-0073819 filed on Sep. 15, 2004 in the Korean Intellectual Property Office, and U.S. Provisional Patent Application No. 60/586,724, filed on Jul. 12, 2004 in the United States Patent and Trademark Office, the disclosures of which are incorporated herein by reference in its entirety.

BACKGROUND OF THE INVENTION

1. Field of the Invention

Apparatuses and methods consistent with the present invention relate to processing a digital rights object, and more particularly, to converting the digital rights object received from a rights issuer into a format for communicating with a portable storage device and transmitting and receiving the converted format of the digital rights object so that the load of the portable storage device can be reduced and data transmission efficiency can be increased.

2. Description of the Related Art

Recently, studies on digital rights management (hereinafter, referred to as DRM) have been actively conducted and commercial services using DRM have been introduced. The reason for using DRM is due to the properties of digital data. Digital content is apt to be copied and reused, processed and distributed, unlike analog data. However, it takes significant time and money to manufacture and distribute digital content. Accordingly, the counterfeiting and the distribution of digital content causes great losses to the manufacturer and it hinders digital content creation.

Efforts to protect digital content have been made in the past. However, only the access to digital content without permission was prevented. That is, a person who paid the cost for the digital content was allowed access to the digital content. However, if the consumer intentionally distributed the digital content to a third party, this third party could use the digital content without paying the cost.

DRM was introduced to solve this problem. DRM unlimitedly permits access to encrypted digital content, but it requires a license called a rights object in order to decrypt and play the encrypted digital content. Accordingly, DRM can efficiently protect digital content, unlike the existing method.

Figure 1:
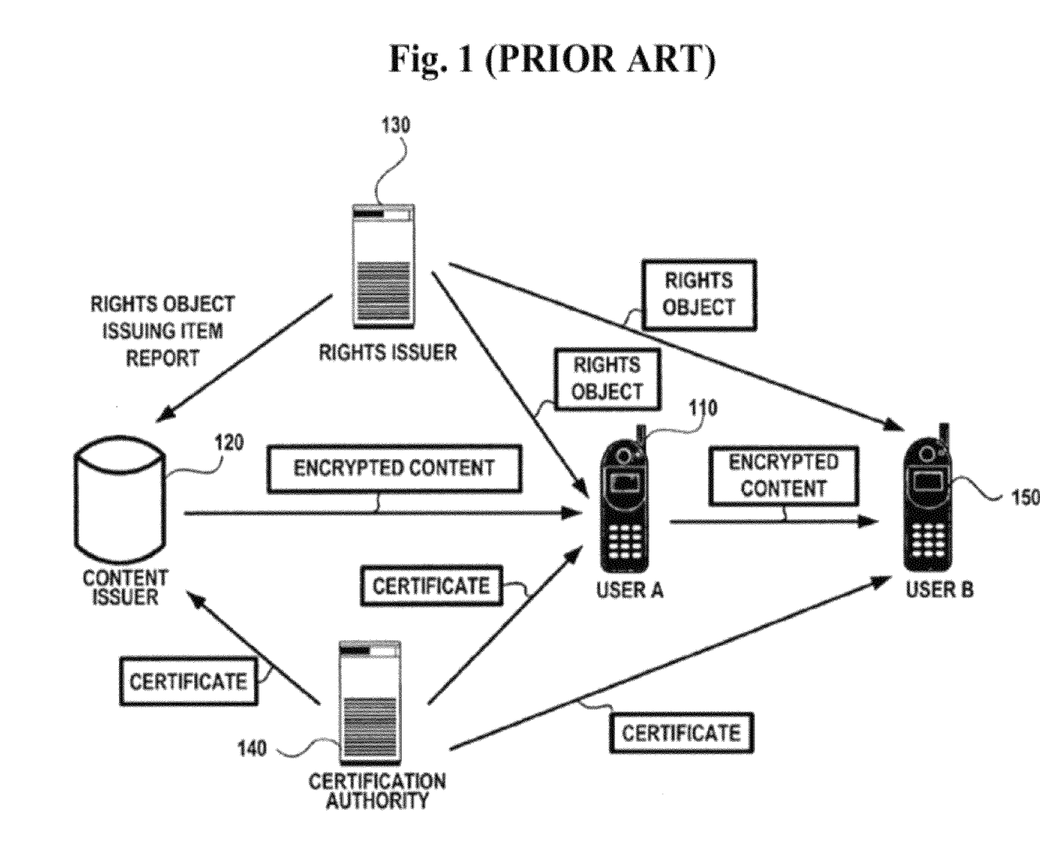
FIG. 1 is an exemplary view schematically showing the concept of digital rights management.

FIG. 1 is an exemplary view schematically showing the concept of digital rights management.

DRM relates to how content protected by a method such as cryptography (hereinafter, referred to as "encrypted content") and the rights object for allowing access to the protected content are processed.

In FIG. 1, users 110, 150 that want to access the content protected by DRM, a content issuer 120 for issuing the content, a rights issuer 130 for issuing the rights object including the right for accessing to the content, and a certification authority 140 for issuing a certificate are shown.

The user A 110 can obtain desired content from the content issuer 120. At this time, the encrypted content protected by the DRM is obtained. The user A 110 can obtain the license for playing the encrypted content from the rights object received from the rights issuer 130. The user A 110 having the rights object can play the encrypted content. Since the encrypted content can be freely distributed, user A 110 can freely deliver the encrypted content to another user B 150. The user B 150 must have the rights object in order to play the encrypted content, and the rights object can be obtained from the rights issuer 130. The certification authority 140 issues the certificate representing that the user A 110 and the user B 150 are valid users. When manufacturing devices of the users 110, 150, the certificate may be input in the devices. However, if the certificate expires, the certificate can be reissued from the certification authority 140.

DRM can aid the digital content industry by protecting the manufacturers and suppliers of the digital content.

Figure 2:
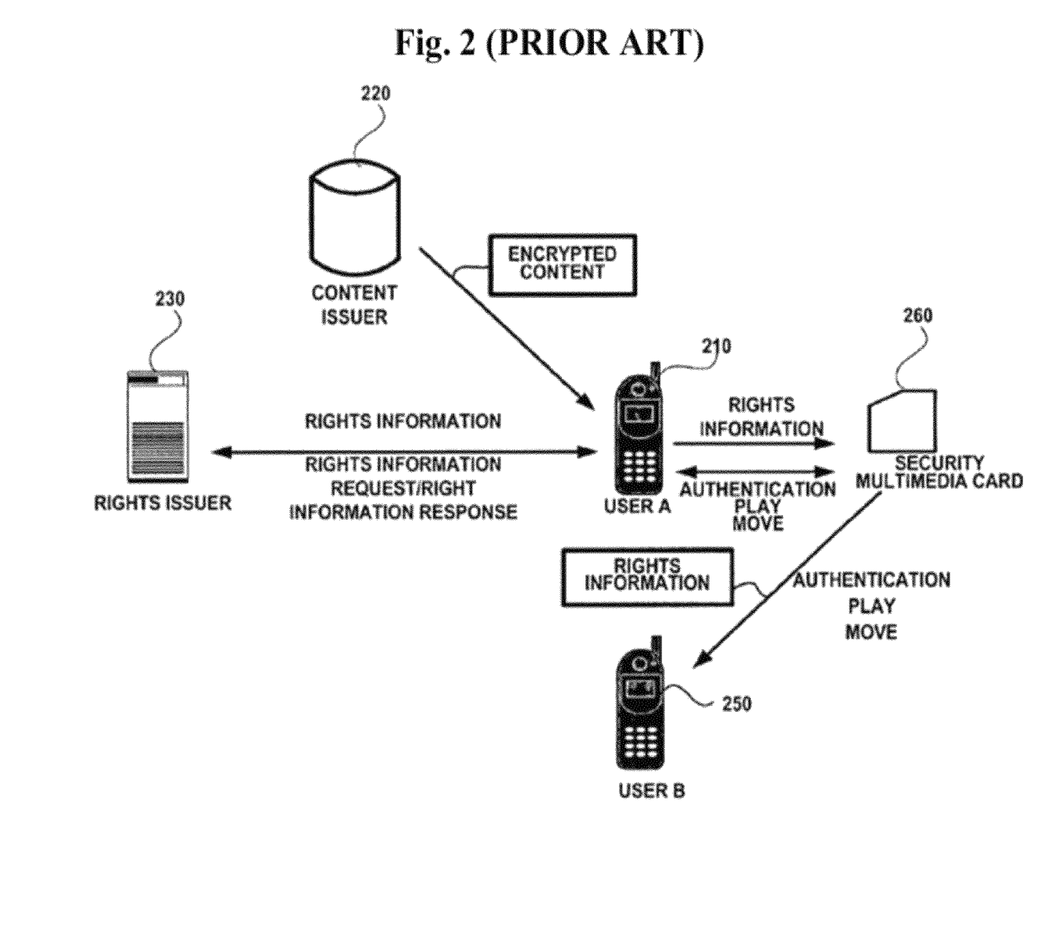
FIG. 2 is an exemplary view schematically showing the concept of the digital rights management using a security multimedia card.

FIG. 2 is an exemplary view schematically showing the concept of the digital right management using a security multimedia card.

The user A 210 can obtain the encrypted content from a content issuer 220.

The rights object includes information about the encryption of the content, the definition of the right for the content, and usage restriction information of the content. In addition, the rights object includes the actual right. The right for the content may include a play right and the usage restriction information may include a play number, a play time, and a play period. Also, the right may include a move right or a copy right. That is, the rights object having the move right may be moved to another device or the security multimedia card, and the rights object having the copy right may be copied to another device or the security multimedia card. In the case of the move right, the original rights object is deactivated (this involves deleting the rights object or the right included in the rights object) by the movement of the rights object. But, in the case of the copy right, the original rights object can be used in the activated state.

The user A 210 obtains the encrypted content and requests the rights object from the rights issuer 230 so as to obtain the play right thereof.

If the user A 210 receives a rights object response and the rights object from the rights issuer 230, the user can play the encrypted content using the received rights object. When delivering the rights object to the user B 250 having the corresponding encrypted object, the user A 210 can deliver it using a portable storage device. In one embodiment, the portable storage device may be the security multimedia card 260 having a DRM function, and in this case the user A 210 moves the rights object into the security multimedia card 260 after performing authentication with the security multimedia card 260. The user A 210 requests the play right from the security multimedia card 260 and then receives the play right (for example, a content encryption key) from the security multimedia card 260 so that the encrypted content can be played. After performing the authentication with the user B 250, the security multimedia card 260 moves the rights object to the user B 250 or allows the user B 250 to play the encrypted content.

At this time, the rights object used in the DRM as mentioned above is shown in FIG. 3.

Figure 3:
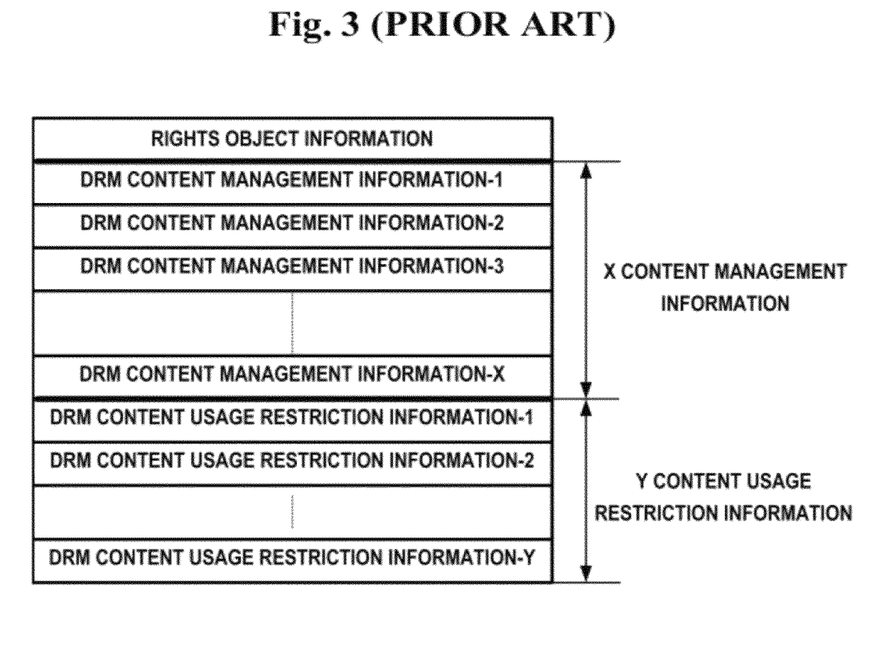
FIG. 3 is an exemplary view showing the structure of a rights object.

As shown in FIG. 3, the rights object used in DRM includes rights object information, DRM content management information, and DRM content usage restriction information.

The rights object information includes an identifier for identifying a rights object from the other rights objects.

DRM content is digital content where the usage is managed and controlled by the rights object, and the plural pieces of the DRM content management information may exist in one rights object. One set of DRM content management information includes a DRM content identifier and an encryption/decryption key for the DRM content.

The plural pieces of the DRM content usage restriction information may exist in one rights object and the DRM content usage restriction information refers at least one set of DRM content management information. Also, the DRM content usage restriction information includes information for controlling the usage of the DRM content, such as a usage number, a usage period and a usage date.

The rights object used in DRM can be expressed in XML format, and in this case, the portable storage device such as a MMC card, an SD card or a USB storage medium must have an XML parser function for interpreting the rights objects. However, the portable storage device, which has limited resources, is loaded so as to provide these functions. Also, since the XML rights object is not restricted in size, it may be difficult for the portable storage device to store the rights object.

Accordingly, the rights object must be converted to a new format so that the rights object can be efficiently managed.

SUMMARY OF THE INVENTION

An aspect of the present invention is to provide an apparatus and a method which converts an XML format of a digital rights object which is received from a rights issuer into a format for communicating with the portable storage device and transmits and receives the converted format of the rights object to/from the portable storage device so that the load of the portable storage device can be reduced and the data transmission efficiency can be increased.

The present invention is not limited to the above-mentioned aspect and other aspects which are not mentioned will become more apparent to those of ordinary skill in the art from the description provided below.

An apparatus for processing digital rights object according to an exemplary embodiment of the present invention comprises a transmitting/receiving module for receiving the rights object expressed in a Markup language from a rights issuer, a rights object converting module for converting the rights object received from the transmitting/receiving module into a frame having a format for communicating with a portable storage device, an interface for performing the connection with the portable storage device, and a control module for providing the frame to the portable storage device through the interface and receiving the converted format of the rights object from the portable storage device through the interface.

Furthermore, a portable storage device according to an exemplary embodiment of the present invention comprises an interface for connecting with a device, a control module for receiving and interpreting a converted format of a rights object from the device through the interface and providing the converted format of the rights object to the device, and a storage module for storing the converted format of the rights object provided by the control module in a format supported by the portable storage device.

Moreover, a method for processing digital rights object according to an embodiment of the present invention comprises receiving the rights object expressed in a Markup language from a rights issuer, converting the received rights object into a frame having a format for communicating with a portable storage device, providing the frame to the portable storage device or receiving the frame from the portable storage device.

In addition, a method for processing digital rights object according to an embodiment of the present invention comprises receiving a converted format of a rights object from a device, interpreting the converted format of the rights object, and storing the interpreted rights object in the format supported by a portable storage device.

Various details of exemplary embodiments are included in the detailed description and drawings.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the attached drawings.

Prior to the description, the meanings of the terminology used in the present specification will be simply described. However, the description of the terminology is to help in the understanding of the present specification and is not used for limiting the technical spirit of the present invention.

Public-Key Cryptography

Public-key Cryptography or asymmetric cryptography refers to cryptography where the key used in decrypting the data is different from the key used in encrypting the data. Since the encryption key or the public key need not be secret, the encryption key can be exchanged in a general channel. This public-key cryptography algorithm is well known and it has the property that it is hard for a third party to discover the original text using the algorithm, the encryption key and the encrypted sentence. Examples of public-key cryptography include Diffie-Hellman, RSA, ElGamal, and Elliptic Curve. Since the public-key cryptography is slower than the symmetric-key cryptography by a factor of 100-1000, it is used in the key exchange or the digital signature, rather than for content encryption.

Symmetric-Key Cryptography

Symmetric-key Cryptography or private-key cryptography refers to cryptography where the key used in decrypting the data is equal to the key used in encrypting the data. DES (Data Encryption Standard) is an example of symmetric-key cryptography, and an application employing AES (Advanced Encryption Standard) has become popular in recent years.

Certificate

In public-key cryptography the certification authority produces certificates, which are messages which sign the identity and the public key of a specific subscriber with a private key of the certification authority. Accordingly, if the public key of the certification authority is applied to the certificate, the integrity of the certificate can be easily checked, and thus, a third party can be prevented from freely altering the public key of a user.

Digital Signature

A Digital Signature is a document that is prepared by a signer. Examples of digital signatures include RSA digital signatures, ELGamal digital signatures, DSA digital signatures, and Schnorr digital signatures. In the case of the RSA digital signature, a transmitter of the encrypted message encrypts the message with his/her own private key and transmits it, and the receiver decrypts the encrypted message with the public key of the transmitter. In this case, it is proven that the encryption of the message was performed by the transmitter.

Random Numbers/Strings

Random numbers or strings are numbers or strings having randomness. Since the generation of a genuine random number is computationally expensive, a pseudo-random number may be used.

Portable Storage Devices

The portable storage device used in the present invention includes a non-volatile readable and erasable property memory, such as a flash memory, and it can be connected to the device. Examples of the storage device include smart media, memory sticks, CF cards, SD cards and security multimedia cards. In the description below, the security multimedia card will be described.

In the present embodiment, the device must perform the authentication to use the security multimedia card, and the authentication process will be described with reference to FIG. 4.

Figure 4:
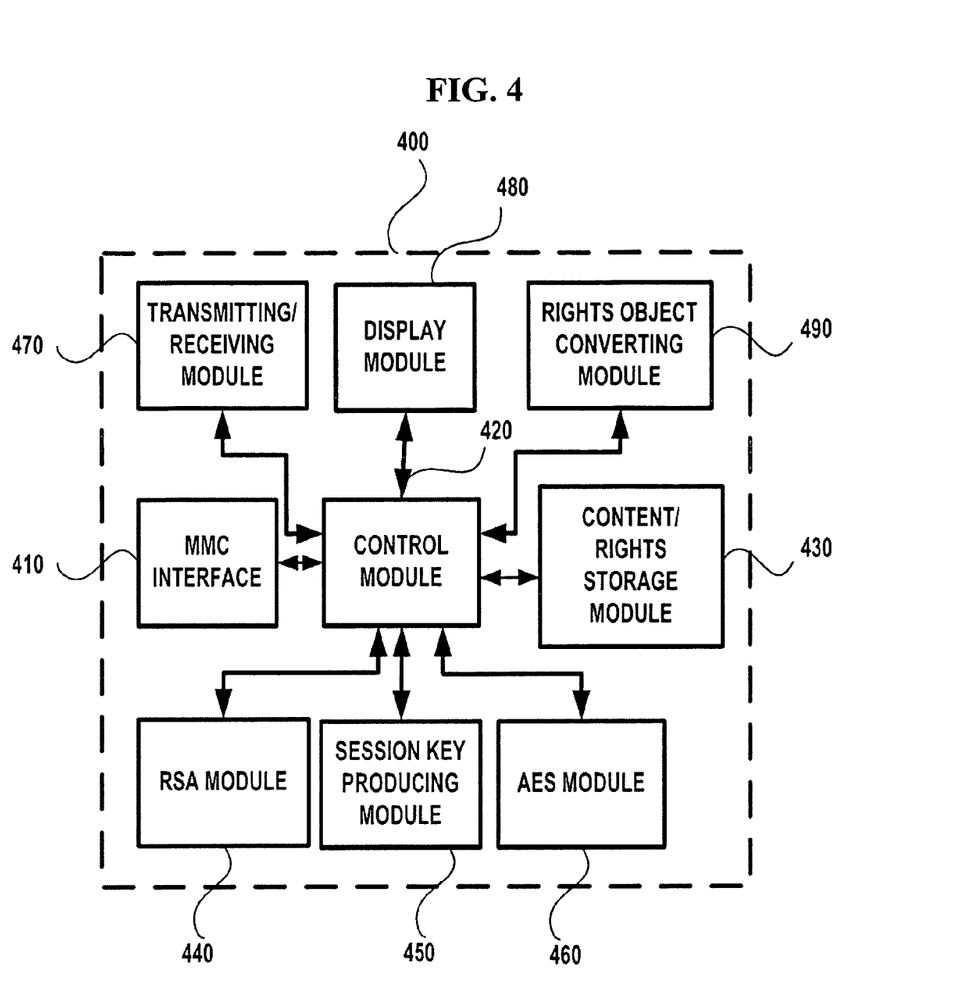
FIG. 4 is a block diagram showing the structure of a device according to an embodiment of the present invention.

FIG. 4 is a block diagram showing the structure of a device according to an embodiment of the present invention.

The term "module" used in the present embodiment means a software or hardware component such as a field-programmable gate array (FPGA) or an application specific integrated circuit (ASIC). The module performs certain functions and it may be constructed so that it exists in an addressable storage medium. Also, it may be constructed to perform the functions of or more processors. Accordingly, the module may include components such as software components, object oriented software components, class components and task component, processes, functions, attributes, procedures, subroutines, segments of program code, drivers, firmware, microcode, circuits, data, databases, data structures, tables, arrays and variables. The components and modules can be coupled to form a smaller number of components and modules, or they can be separated into additional components and modules. In addition, the components and the modules can be embodied to perform the functions of one or more CPUs in the security multimedia card or the device.

In order to perform DRM processes, the device 400 must provide a security function, a function for storing the content and the rights object, a function for exchanging data, a data transmitting/receiving function for communicating with the content issuer or the rights issuer, and a DRM managing function. Accordingly, the device 400 includes an RSA module 440, a session key producing module 450 and an AES module 460 having the security function. Also, the device 400 includes a content/rights storage module 430 for storing the content and rights, a MMC interface 410 for exchanging data with the security multimedia card and a control module 420 for controlling each module to perform the DRM process. In addition, the device 400 includes a transmitting/receiving module 470 for transmitting and receiving data, a rights object converting module 490 for converting the format of the rights object received from the rights issuer 230 and a display module 480 for displaying the content.

The transmitting/receiving module 470 allows the device 400 to communicate with the content issuer or the rights issuer. The device 400 can receive the rights object or the encrypted content through the transmitting/receiving module 470.

The rights object converting module 490 converts the rights object received from the rights issuer 230 through the transmitting/receiving module 470 into a suitable format for the security multimedia card, such as XML or WBXML (the rights expression language or REL). Accordingly, an XML or WBXML rights object is composed of an attribute and elements representing its role. For example, the play right expressed in XML is:

<o-ex:rights
xmlns:o-ex="http://odrl.net/1.1/ODRL-EX"
xmlns:o-dd="http://odrl.net/1.1/ODRL-DD">
<o-ex:context>
<o-dd:version>1.0</o-dd:version>
</o-ex:context>
<o-ex:agreement>
<o-ex:asset>
<o-ex:context>
<o-dd:uid>cid:4567829547@foo.com</o-dd:uid>
</o-ex context>
</o-ex:asset>
<o-ex:permission>
<o-dd:play/>
</o-ex:permission>
</o-ex:agreement>
</o-ex:rights>

Figure 5:
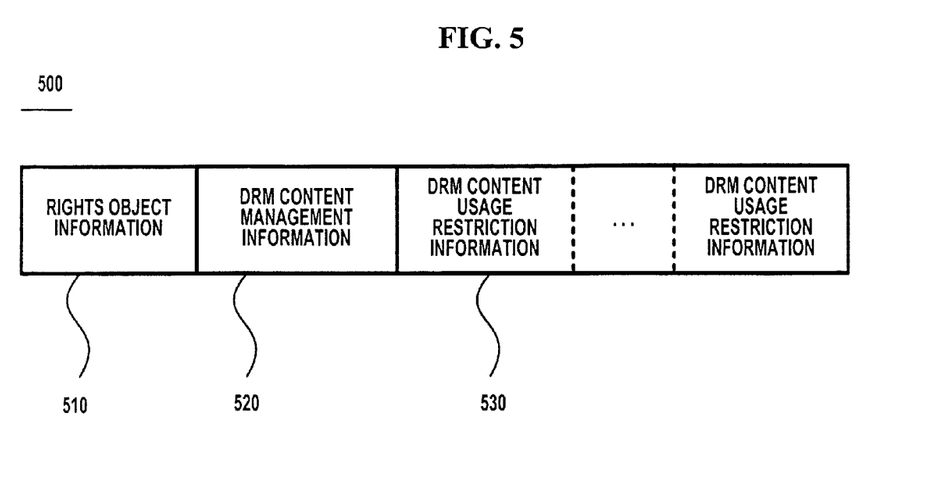
FIG. 5 is an exemplary view showing the structure of a conversion frame according to an embodiment of the present invention.

If the XML format is used, when the device transmits the rights object to the portable storage device or when the security multimedia card modifies the rights object, the security multimedia card should interpret the rights object. As such, XML must be supported. However, since many resources for supporting XML are needed, overhead increases. If communication is performed using the XML format, it takes too much time to transmit the rights object. Accordingly, the device 400 according to one embodiment of the present invention converts the XML format of the rights object into another format (hereinafter, referred to as 'conversion frame') by the rights object converting module 490. In FIG. 5, the structure of a conversion frame according to one embodiment of the present invention is shown.

The conversion frame 500 includes a rights object information field 510, a DRM content management information field 520 and DRM content usage restriction information fields 530. A conversion frame 500 has a fixed byte length and includes one set of DRM content management information, unlike the XML rights object expressed in FIG. 3. That is, the XML rights object includes a plurality of DRM content management information and a plurality of DRM content usage restriction information. The DRM content usage restriction information includes information which refers to DRM content management information. However, the conversion frame 500 includes one set of DRM content management information and it includes only the usage restriction information for controlling the corresponding DRM content.

The rights object information field 510 includes an identifier for identifying the rights object. DRM content is digital content that is managed and controlled by the rights object. The DRM content management information field 520 includes a DRM content identifier for specific DRM content and an encryption/decryption key of the corresponding DRM content. The DRM content usage restriction information field 530 includes information for controlling the use of the DRM content. This information includes, for example, information regarding the play, display, execute, print, export, copy, and move licenses.

The play license is the right for expressing the DRM content in audio/video form. Accordingly, the control module 420 does not give the play right to the content that cannot be expressed by this method; for example, a Java game.

The play license may have constraints. If the constraints are specified, the control module 420 grants the play right according to the constraint(s). If the constraint is not specified, the control module 420 grants an unlimited play right.

The display license is the right for expressing the DRM content in a viewing device. Accordingly, the control module 420 does not give the display right to the content having a format that cannot be expressed in the viewing device, such as a gif or jpeg image.

The execute license is the right for executing DRM content such as java games or other application programs. The print license is the right for producing a hard copy of the DRM content (e.g., a jpeg image).

The export license is the right for exporting the rights object to a DRM system or a content protecting structure, but not an OMA (Open Mobile Alliance) DRM system. The export license necessarily has constraints. The constraints specify which DRM system or content protecting structure the DRM content and the rights object can be exported to. In the export license, there is a move mode and a copy mode. When exporting the rights object, the rights object in the current DRM system is deactivated in the move mode, but is not deactivated in the copy mode.

The move license includes the move from the device to the security multimedia card and the move from the security multimedia card to the device. The move from the device to the security multimedia card transmits the rights object in the device to the security multimedia card and deactivates the original rights object in the device. The move from the security multimedia card to the device is similar to the move from the device to the security multimedia card.

The copy license includes the copy from the device to the security multimedia card and the copy from the security multimedia card to the device. The copy from the device to the security multimedia card transmits the rights object in the device to the security multimedia card, but it does not deactivate the original rights object in the device. The copy from the security multimedia card to the device is similar to the copy from the device to the security multimedia card.

The method for converting the XML rights object expressed into the conversion frame according to one embodiment of the present invention will be described with reference to FIG. 6.

The MMC interface 410 allows the device 400 to be connected with the security multimedia card. Basically, connecting the device 400 with the security multimedia card means that the interfaces of the security multimedia card and the device are electrically connected to each other. The term "connection" should be interpreted as including communication through a wireless medium in the non-contact state.

The RSA module 440 performs RSA public-key cryptography according to the request of the control module 420. In the present embodiment of the present invention, for example, RSA cryptography is used for the digital signature or the key exchange (a random number) in the authentication process. Other types of public-key cryptography may be used.

The session key producing module 450 produces a random number to be delivered to the device, and it produces the session key using the random number received from the device and the random number it produced. The random number produced by the session key producing module 450 is encrypted through the RSA module and is delivered to the device through the MMC interface 410. Producing the random number by the session key producing module 450 is exemplary, and a random number may be selected from a plurality of random numbers already in existence.

The AES module 460 is a symmetric-key cryptographic module and it performs the symmetric-key cryptography using the produced session key. The AES module is mainly used in receiving the encryption key of the content from the rights object and encrypting it with the session key. In addition, the AES module is used when important information is encrypted in the communication process with the device. In the present embodiment of the invention, the session key is used when the rights object is encrypted in the rights object moving process. The AES cryptography is also exemplary, and other symmetric-key cryptography methods such as DES may be used.

The content/rights storage module 430 stores the encrypted content and the rights objects. The format of the rights object is converted by the rights object converting module 490. The rights objects are stored in an encrypted state. The device 400 encrypts the rights objects using the AES method and a unique key which cannot be read by the other devices or security multimedia cards, and it decrypts the encrypted rights objects using the unique key when the rights objects are moved or copied to other security multimedia cards or devices. Symmetric-key cryptography using the unique key is exemplary, and a method of encrypting the rights object with the private key of the device 400, and if necessary, decrypting it with the public key of the device 400 may be used.

The display module 480 displays the content, which the rights object allows to be played, so that the user can view it. The display module 480 can be embodied by a liquid crystal display device such as TFT LCD or an organic EL device.

Figure 6:
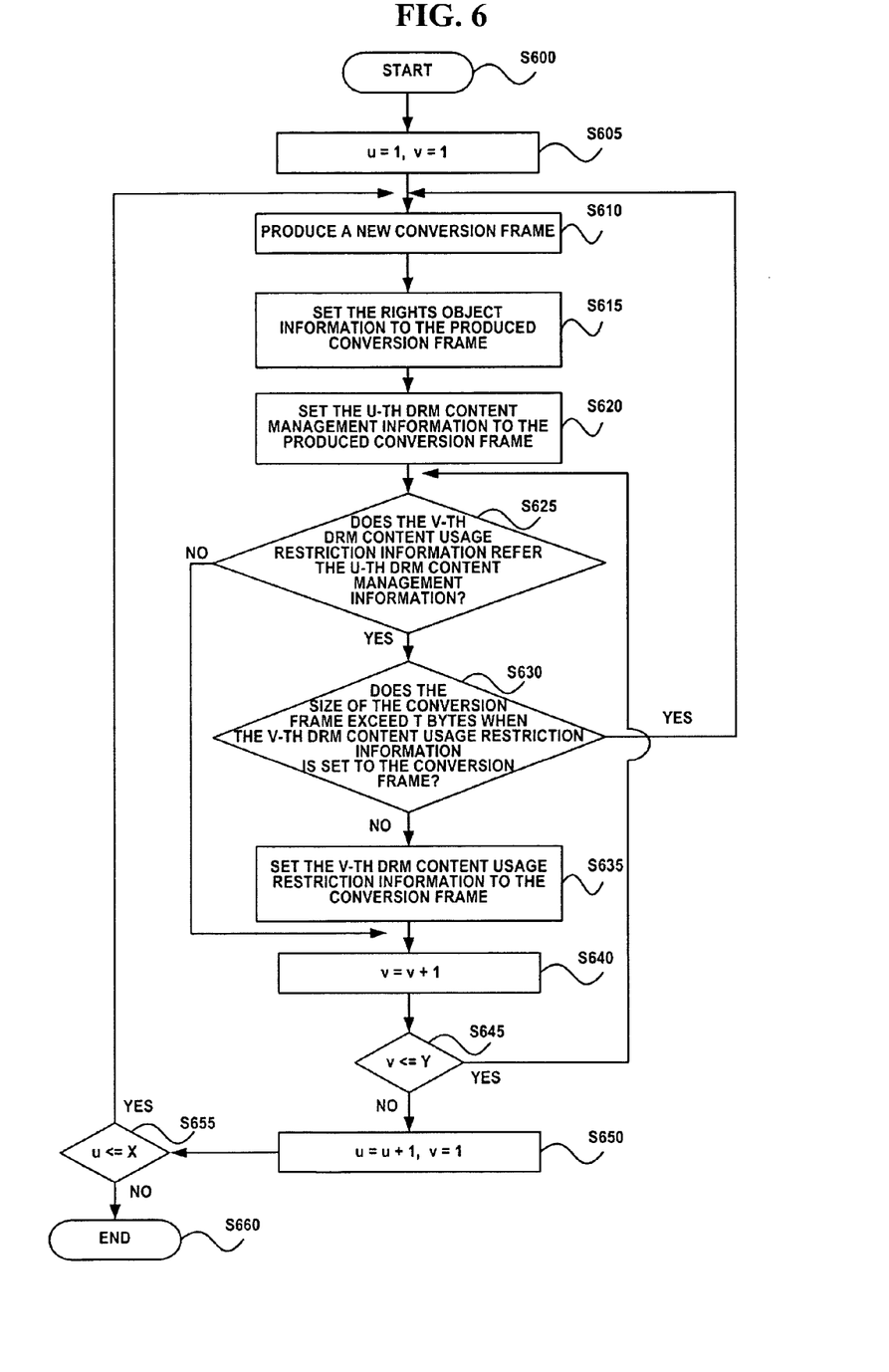
FIG. 6 is a flowchart showing a method for converting the rights object expressed by an XML format into the conversion frame according the embodiment of the present invention.

FIG. 6 is a flowchart showing a method for converting the XML rights object into a conversion frame according to an embodiment of the present invention.

First, the transmitting/receiving module 470 of the device 400 receives the XML rights object from the rights issuer and transmits the received rights object to the rights object converting module 490 through the control module 420. At this time, the rights object includes a rights object information field, X DRM content management information fields, and Y DRM content usage restriction information fields.

If the rights object converting module 490 receives the rights object, the rights object converting module 490 begins to convert the rights object into the conversion frame, as shown in FIG. 6 (S600).

The rights object converting module 490 produces an integer type of a variable 'u' representing the DRM content management information index information and an integer type of a variable 'v' representing the usage restriction information index information. Here, the initial values are set to 1 (S605).

Then, the rights object converting module 490 produces the data structure of the conversion frame 500 shown in FIG. 5 (S610). The data structure has a fixed size and a portable storage device such as the security multimedia card can read or write the data structure. In the description below, the size of the data structure is T bytes.

The rights object converting module 490 sets the rights object information included in the rights object in the rights object information field 510 of the produced conversion frame 500 (S615). Also, rights object converting module 490 sets the u-th DRM content management information included in the rights object in the DRM content management information field 520 of the produced conversion frame 500 (S620).

The rights object converting module 490 performs the process of verifying Y sets of usage restriction information included in the rights object, in order to set the usage restriction information in the conversion frame 500.

In other words, it is checked whether the v-th DRM content usage restriction information refers to the u-th DRM content management information (S625), and, if so, it is checked whether the size of the data set up to now exceeds the T bytes, which is the size of the conversion frame 500, when the v-th DRM content usage restriction information is set in the conversion frame 500 (S630). At this time, if the size of the data set up to now exceeds T bytes, steps S610 to S625 are repeated. That is, since the conversion frame has a fixed size of T bytes, a new separate conversion frame is produced to set the DRM content usage restriction information.

If the size of the data set up to now does not exceed T bytes, the v-th DRM content usage restriction information is set in the conversion frame 500 (S635). Then, the value 'v' is increased by 1 (S640). At this time, if the increased value 'v' is less than or equal to the value 'Y' which is the total number of usage restriction information fields, the step for checking whether the v-th DRM content usage restriction information refers the u-th DRM content management information is repeated (S645, S625).

On the other hand, if the v-th DRM content usage restriction information does not refer to the u-th DRM content management information, the value 'v' is increased by 1 and the increased value 'v' is compared with the value 'Y' (S640).

If 'v' is larger than 'Y', 'u' is increased by 1 and 'v' is set to 1 in order to set the other DRM content management information included in the rights object in the conversion frame (S650). Then, if the increased value 'u' is less than or equal to X, which is the total number of DRM rights object management information fields included in the XML rights object, step 610 is performed to produce a new conversion fame for the u-th DRM rights object management information (S655, S610). At this time, if the increased value 'u' is larger than X, since all the DRM content management information included in the rights object is set in the conversion frames, the rights object converting module 490 completes the operation for converting the XML rights object into the conversion frame (S660). Then, the control module 420 stores the plural conversion frames in the content/right storage module 430 or it transmits them to a portable storage device such as the security multimedia card through the MMC interface 410.

As mentioned above, one conversion frame is composed of a plurality of fields. However, supposing that any conversion frame has p fields, any field $f_a$ ($1 \leq a \leq p$) has the length of $l_a$ bytes from the location which the field $f_a$ begins. A field $f_k$ ($1 \leq k \leq p, k \neq a$) does not intrude into the region of the length of $l_a$ bytes from the location which the field $f_a$ begins.

Figure 7:
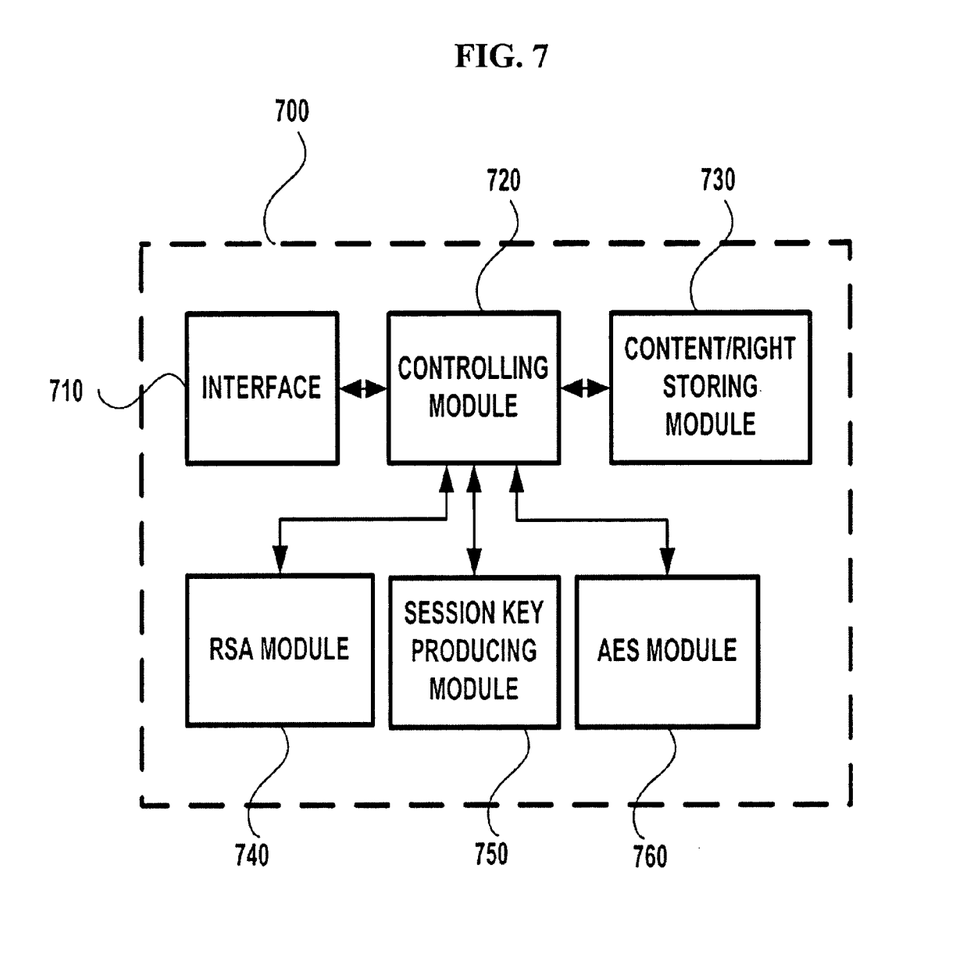
FIG. 7 is a block diagram showing the structure of a security multimedia card according to an exemplary embodiment of the present invention.

FIG. 7 is a block diagram showing the structure of a security multimedia card according to an embodiment of the present invention.

In order to perform the DRM process, the security multimedia card 700 must have a security function, a function for storing the content or the rights object, a function for exchanging the data with the device and a DRM managing function. Accordingly, the security multimedia card 700 includes an RSA module 740, a session key producing module 750, and an AES module 760 having the security function, a content/rights storage module 730, and an interface 710 for exchanging the data with the device, and a control module 720 for controlling each module to perform the DRM process.

The interface 710 allows the security multimedia card 700 to connect with the device. Connecting the security multimedia card 700 with the device means that the interfaces of the security multimedia card 700 and the device are electrically connected to each other. The word "connection" should be interpreted to include communication performed through a wireless medium in a non-contact state.

The control module 720 controls each module to perform the DRM process and receives the conversion frame produced by the rights object converting module 490 of the device through the interface 710. The control module 720 interprets the received conversion frame and provides the resultant data to each module, and it provides the rights object corresponding to the conversion frame to the device.

The RSA module 740 performs RSA public-key cryptography according to the request of the control module 720. In an embodiment of the present invention, for example, RSA cryptography is used in the digital signature and/or the key exchange (a random number) of the authentication process. Other types of public-key cryptography may be used.

The session key producing module 750 produces the random number to be delivered to the device, and it produces the session key using the random number received from the device and the random number it produced. The random number produced by the session key producing module 750 is encrypted through the RSA module, and it is delivered to the device through the interface 710. Producing the random number by the session key producing module 750 is exemplary, and the random number may be selected from a plurality of random numbers which exist already.

The AES module 760 is a symmetric-key cryptographic module that performs symmetric-key cryptography using the session key. The AES module is mainly used in receiving the encryption key from the rights object and encrypting it to produce the session key. In addition, the AES module is used when important information is encrypted in the communication process with the device. In an embodiment of the present invention, the session key is used when the rights object is encrypted in the rights object moving process. Using AES cryptography is also exemplary, and other symmetric-key cryptography methods such as DES may be used.

The content/rights storage module 730 stores the encrypted content and the rights objects having the conversion frame form. The rights objects are stored in an encrypted state. The security multimedia card 700 encrypts the rights objects using the AES method and a unique key which cannot be read by other devices or security multimedia cards, and it decrypts the encrypted rights objects using the unique key when the rights objects are moved or copied to other security multimedia cards or devices. Using symmetric-key cryptography and the unique key is exemplary, and a method of encrypting the rights object with the private key of the security multimedia card 700, and, if necessary, decrypting it with the public key of the security multimedia card 700 may be used.

Also, there is a method for reading the digital rights information of the DRM content from the conversion frame, a method for writing the digital rights information of the DRM content to the conversion frame, and a method for updating the information regarding the rights object stored in the conversion frame, and each of the methods will be described in the following. At this time, '$S_a$' bytes represents the distance between a specific field of the conversion frame and the starting address of the conversion frame, and $l_a$ bytes represents the length of a specific field.

In the case of reading the digital rights information of the DRM content from the conversion frame, the control module 720 of the security multimedia card 700 reads $l_a$ bytes after moving $S_a$ bytes from the starting address of the conversion frame, when reading any field $f_a$ of the conversion frame.

In the case of writing the digital rights information of the DRM content to the conversion frame, the control module 720 of the security multimedia card 700 writes $l_a$ bytes after moving $S_a$ bytes from the starting address of the conversion frame, when writing the digital rights information of the DRM content to any field $f_a$ of the conversion frame.

In the case of updating the information regarding the rights object stored in the conversion frame, the control module 720 of the security multimedia card 700 reads $l_a$ bytes after moving $S_a$ bytes from the starting address of the conversion frame, updates the information, and writes $l_a$ bytes of information, when updating any field $f_a$ of the conversion frame.

According to the present invention, since the device converts the format of the rights object received from the rights issuer into a format which does increase the overhead of the portable storage device, and then transmits/receives the converted format of the rights object to/from the portable storage device, the load of the portable storage device can be reduced. Also, by using the converted format of the rights object when the device transmits/receives the rights object to/from the portable storage device, the transmitting time can be shortened.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing a digital rights object comprising:
    a transmitting/receiving hardware module configured to receive the rights object expressed in a Markup language from a rights issuer, wherein the rights object includes a plurality of sets of digital rights management (DRM) content management information;
    a rights object converting module for converting the rights object received from the transmitting/receiving module into a frame having a format for communicating with a portable storage device;
    an interface configured to provide a connection with the portable storage device; and
    a control module configured to provide the frame to the portable storage device through the interface and to receive the converted format of the rights object from the portable storage device through the interface;
    wherein the converted format of the rights object is an abbreviated format which includes only one set of DRM content management information for communicating with the portable storage device.

2. The apparatus according to claim 1, wherein the Markup language is XML.

3. The apparatus according to claim 1, wherein the frame has a fixed length.

4. The apparatus according to claim 3, wherein the frame includes a rights object information field.

5. The apparatus according to claim 3, wherein the frame includes DRM content management information.

6. The apparatus according to claim 3, wherein the frame includes DRM content usage restriction information.

7. The apparatus according to claim 1, further comprising:
    a public-key cryptographic module configured to perform authentication with the portable storage device connected by the interface; and
    a session key producing module configured to produce a session key shared with the authenticated portable storage device.

8. A portable storage device, comprising:
    an interface configured to connect with a device;
    a control hardware module configured to receive and interpret a converted format of a rights object, wherein the rights object includes a plurality of sets of digital rights management (DRM) content management information, from the device through the interface and to provide the converted format of the rights object to the device; and
    a storage module configured to store the converted format of the rights object provided by the control module in a format supported by the portable storage device;
    wherein the converted format of the rights object is an abbreviated format which includes only one set of DRM content management information for communicating with the portable storage device.

9. The portable storage device according to claim 8, wherein the converted format of the rights object has a fixed-length frame format.

10. The portable storage device according to claim 9, wherein the frame includes a rights object information field.

11. The portable storage device according to claim 9, wherein the frame includes DRM content management information.

12. The portable storage device according to claim 9, wherein the frame includes DRM content usage restriction information.

13. A method for processing a digital rights object comprising:
    receiving the rights object expressed in a Markup language from a rights issuer, wherein the rights object includes a plurality of sets of digital rights management (DRM) content management information;
    converting the received rights object into a frame having a format for communicating with a portable storage device;
    providing the frame to the portable storage device;
    wherein the format of the frame of the rights object is an abbreviated format which includes only one set of DRM content management information for communicating with the portable storage device.

14. The method according to claim 13, wherein the Markup language is XML.

15. The method according to claim 13, wherein the frame has a fixed length.

16. The method according to claim 13, wherein the frame includes a rights object information field.

17. The method according to claim 15, wherein the frame includes DRM content management information.

18. The method according to claim 15, wherein the frame includes DRM content usage restriction information.

19. The method according to claim 13, further comprising performing authentication with the portable storage device.

20. A method for processing digital rights object, comprising:
    receiving a converted format of a rights object from a device, wherein the rights object includes a plurality of sets of digital rights management (DRM) content management information;
    interpreting the converted format of the rights object; and storing the interpreted rights object in the converted format supported by a portable storage device;

wherein the converted format of the rights object is an abbreviated format which includes only one set of DRM content management information for communicating with the portable storage device.

21. The method according to claim 20, wherein the converted format of the rights object includes a frame having a fixed length.

22. The method according to claim 21, wherein the frame includes a rights object information field.

23. The method according to claim 21, wherein the frame includes one set of DRM content management information.

24. The method according to claim 21, wherein the frame includes one set of DRM content usage restriction information.

25. The method according to claim 20, further comprising providing the converted format of the rights object to the device.

26. The apparatus according to claim 1, wherein the portable storage device is a security multimedia card.

27. A portable storage device, comprising:

an interface for connecting with a device for performing digital rights management;

a control hardware module for receiving and interpreting a converted format of a rights object from the device for performing digital rights management through the interface to connect with the device for performing digital rights management, wherein the rights object includes a plurality of sets of digital rights management (DRM) content management information, and providing the converted format of the rights object to the device for performing digital rights management; and a storage module for storing the converted format of the rights object provided by the control hardware module for receiving and interpreting a converted format in a format supported by the portable storage device;

wherein the converted format of the rights object is an abbreviated format which includes only one set of DRM content management information for communicating with the portable storage device.

28. The apparatus according to claim 1, wherein the abbreviated format comprises a fixed byte length.

29. The apparatus according to claim 1, wherein the abbreviated format comprises only usage restriction information for controlling the one set of DRM content.

* * * * *